(12) United States Patent
Stearns et al.

(10) Patent No.: US 10,759,717 B2
(45) Date of Patent: Sep. 1, 2020

(54) COMPOST BIN

(71) Applicant: Medal Technologies, LLC, Van Buren, OH (US)

(72) Inventors: Larry Stearns, Van Buren, OH (US); Michael Stearns, Van Buren, OH (US)

(73) Assignee: MEDAL TECHNOLOGIES, LLC, Van Buren, OH (US)

( * ) Notice: Subject to any disclaimer, the term of this patent is extended or adjusted under 35 U.S.C. 154(b) by 238 days.

(21) Appl. No.: 15/869,378

(22) Filed: Jan. 12, 2018

(65) Prior Publication Data

US 2018/0201550 A1 Jul. 19, 2018

Related U.S. Application Data

(60) Provisional application No. 62/445,772, filed on Jan. 13, 2017.

(51) Int. Cl.
*C05F 17/907* (2020.01)
*C05F 17/70* (2020.01)
*C05F 17/971* (2020.01)

(52) U.S. Cl.
CPC ............ *C05F 17/907* (2020.01); *C05F 17/70* (2020.01); *C05F 17/971* (2020.01); *Y02P 20/145* (2015.11); *Y02W 30/43* (2015.05)

(58) Field of Classification Search
CPC .............. C05F 17/0205; C05F 17/0072; C05F 17/0264; C05F 17/0223; C05F 17/02; C05F 17/027; Y02W 30/43; Y02P 20/145
USPC ............................................ 435/290.1–290.4
See application file for complete search history.

(56) References Cited

U.S. PATENT DOCUMENTS

| | | | |
|---|---|---|---|
| 3,845,939 A | 11/1974 | Waldenville | |
| 4,060,945 A | 12/1977 | Wilson | |
| 4,683,674 A | 8/1987 | Faul | |
| 5,215,267 A | 6/1993 | Taylor | |
| 5,890,664 A | 4/1999 | Conant, III | |
| 6,029,918 A * | 2/2000 | Sundberg | C05F 17/0205 241/169.1 |
| 7,520,457 B1 | 4/2009 | Poitras et al. | |
| 8,322,640 B2 | 12/2012 | Langston | |
| 9,409,180 B2 | 8/2016 | Ali | |
| 2008/0209967 A1 * | 9/2008 | Cohn | C05F 17/00 71/9 |
| 2008/0210790 A1 | 9/2008 | Koh | |
| 2009/0189002 A1 | 7/2009 | Santandrea | |

(Continued)

FOREIGN PATENT DOCUMENTS

WO WO-2016010795 A1 * 1/2016 .......... C05F 17/0205

*Primary Examiner* — Michael L Hobbs
(74) *Attorney, Agent, or Firm* — Jacob M. Ward; Ward Law Office LLC

(57) ABSTRACT

A self-regulating compost bin is formed from a temperature-resistant plastic, and is configured to regulate its internal temperature and inform the user when harmful pathogens within the compost are eradicated. The main body of the compost bin is hollow with a lid having a window through which sunlight may enter to heat the compost. The compost bin may also have a controller in communication with a fan. The controller is configured to control an operation of the fan. The controller is also in communication with a transceiver. The controller alerts a user when the interior of the main body remains at a predetermined temperature for a predetermined length of time to ensure the compost is safe for use.

19 Claims, 8 Drawing Sheets

(56) References Cited

U.S. PATENT DOCUMENTS

2009/0286307 A1 11/2009 Kim et al.
2011/0101137 A1 5/2011 Langston

* cited by examiner

COMPOST BIN

CROSS-REFERENCE TO RELATED APPLICATIONS

This application claims the benefit of U.S. Provisional Application No. 62/445,772, filed on Jan. 13, 2017. The entire disclosure of the above application is hereby incorporated herein by reference.

FIELD

The present disclosure relates to a compost bin and, more particularly, to a self-regulating compost bin.

BACKGROUND

Composting is a common method of breaking down organic materials for a variety of uses. It provides a way to dispose of organic waste such as lawn clippings, kitchen scraps, and fecal matter, with cow manure and even human waste making viable compost. Compost may be used for a variety of purposes, but is most often used as a fertilizer for gardening applications.

Users are often cautious when handling compost. Pathogens and parasites may still be present, especially if the compost contains fecal matter. Without proper precautions, compost can spread disease and unwanted illnesses to plants and the surrounding environment.

Compost is formed when bacteria and fungus breakdown cellulosic and other carbohydrate portions of residues into smaller and more concentrated particles. When these bacteria break down matter, they produce an exothermic reaction creating heat. After the temperature of the compost rises above 100° F., heat-loving thermophilic bacteria replace common harmful bacteria. Once the thermophilic bacteria heat the compost to temperatures above 140° F., the heat kills the pathogenic organisms. However, if the compost pile reaches temperatures above 160° F., the heat will kill the beneficial bacteria, and the composting material may become sterile, losing its disease fighting properties.

Many known techniques exist to increase the safety and efficacy of composting. Common techniques include increasing the airflow to the compost pile, providing adequate oxygen to the beneficial bacteria, such as in U.S. Pat. No. 5,215,267 to Taylor. Other techniques include complex heating and cooling methods to ensure the organic material is at the right temperature, such as in U.S. Pat. No. 7,520,457 to Poitras. However, the known art lacks a composting bin capable of calculating when the compost is safe for use.

Known composting bins are also generally formed from metal due to the temperatures associated with the composting process. However, metal bins can be undesirably heavy or unwieldy, and are also subject to corrosion with exposure to the elements.

There is a continuing need for a compost bin that collects and processes the internal temperature of the bin and informs the user when the compost is ready for removal, allowing for efficient use of the compost. Desirably, the compost bin may also be formed from temperature-resistant plastic by rotational-molding techniques.

SUMMARY

In concordance with the instant disclosure, a compost bin that collects and processes the internal temperature of the bin and informs the user when the compost is ready for removal, allowing for efficient use of the compost, and which may also be formed from temperature-resistant plastic by rotational-molding techniques, has been surprisingly discovered.

In an illustrative embodiment, a compost bin includes a hollow main body having a base and a lid with a window. A frame is disposed inside of the hollow main body and is suspended above the base of the hollow main body. A drawer is removably disposed in a side opening formed in the main body, adjacent to the base and beneath the frame. A grate is removably disposed atop the frame inside of the hollow main body.

The lid may be hingedly attached to the main body. The removable drawer may also be disposed at a bottom of the bin, providing an easy means to remove of the compost.

The compost bin may further have a controller connected to a temperature sensor and a fan. Using the temperature sensor, the controller monitors the internal temperature of the main body. The controller lowers the temperature inside the main body using the fan, and thereby militates against an unwanted or unsafe overheating of the compost. The controller is also in communication with a transceiver, which allows the controller to communicate with a user. Upon reaching a predetermined temperature, for a predetermined period of time, the controller sends a signal to the user's computerized device, either directly or through the Internet, informing them that the compost is now safe to use.

In another embodiment, there is method of alerting a user when compost is safe for use. The method involves the controller monitoring the internal temperature on a first periodic basis, and then sending that data to a computer having a memory with a database on a second periodic basis. In a further embodiment, the controller may inform the user that the compost is safe to use via an indicator located on the main body.

In an exemplary embodiment, the method of alerting a user when compost is safe for use includes a step of providing a compost bin having a hollow main body with a base and a lid with a window. The frame is disposed inside of the hollow main body and is suspended above the base of the hollow main body. A drawer is removably disposed in a side opening formed in the main body adjacent to the base and beneath the frame. A grate is removably disposed atop the frame inside of the hollow main body. A fan coupled to the hollow main body and configured to selectively create an air flow within the hollow main body. A controller is in communication with the fan and a temperature sensor. The controller is configured to regulate the temperature inside of the hollow main body. The controller activates the fan once the internal temperature of the hollow main body is about 160° F. A transceiver is in communication with the controller. The controller is further configured to alert a user when the interior of the body remains at a predetermined temperature for a predetermined length of time. The method further includes the step of collecting, by the controller, the temperature within the hollow body every half (½) hour, and sending that data to a server having a memory with a database every four (4) hours. The controller then notifies the user when the temperature inside the main body remains between 120-140° F. for a period of 1-2 days.

DRAWINGS

The above, as well as other advantages of the present disclosure, will become readily apparent to those skilled in the art from the following detailed description, particularly when considered in the light of the drawings described herein.

DETAILED DESCRIPTION

The following detailed description and appended drawings describe and illustrate various embodiments of the compost bin. The description and drawings serve to enable one skilled in the art to make and use the compost bin, and are not intended to limit the scope of the compost bin in any manner. In respect of the methods disclosed, the steps presented are exemplary in nature, and thus, the order of the steps is not necessary or critical unless otherwise disclosed.

FIGS. 1-10 illustrate a compost bin 2 that maintains a predetermined temperature for a predetermined time to kill harmful bacteria and pathogens of compost disposed in the compost bin 2. Once the compost has remained at a predetermined temperature for a predetermined period of time, the compost bin 2 may further be able to notify the user that the compost is free of pathogens.

At least a portion of the compost bin 2 may be formed from a temperature-resistant plastic. In a most particular embodiment, substantially all of the compost bin 2 is formed from the temperature-resistant plastic. The plastic is selected to remain rigid at the predetermined temperature associated with the composting process. For example, the temperature-resistant plastic material may be ultra-high-molecular-weight polyethylene (UHMWPE). The temperature-resistant plastic material may also be cross-linked to enhance the rigidity of the compost bin 2 at the operating temperature. The components of the compost bin 2 may be manufactured by a molding process such as rotational-molding, as a non-limiting example. Other suitable temperature-resistant plastic materials and manufacturing methods are also contemplated and considered within the scope of the present disclosure.

Figure 4:
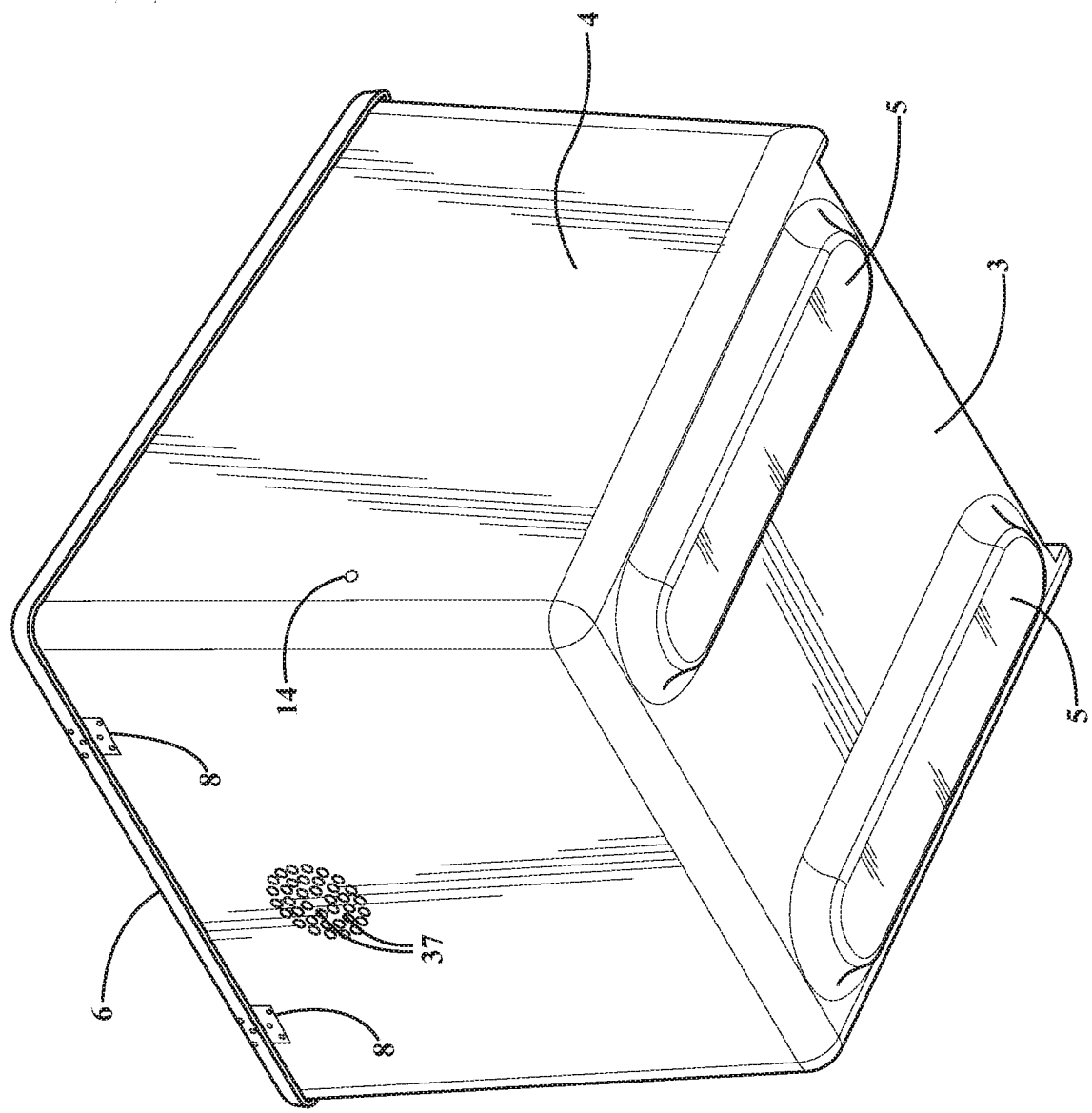
FIG. 4 is a bottom perspective view of the compost bin shown in FIG. 1.
Figure 5:
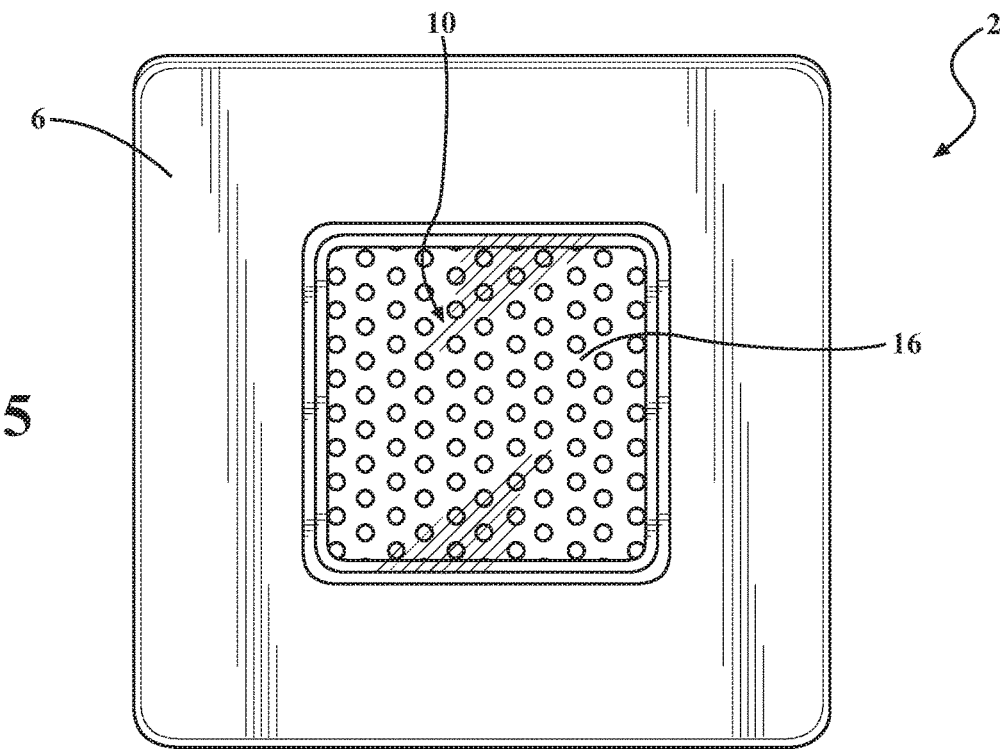
FIG. 5 is a top plan view of the compost bin shown in FIG. 1.

As shown in FIGS. 1-2, 4 and 8, the compost bin 2 has a main body 4 and a lid 6. With reference to FIG. 4, the main body may have a base 3 with a pair of elongate supports 5 that are configured to hold the main body 4 above a ground or floor surface in operation. The elongate supports 5 may be formed by a molding operation where the main body is formed from plastic. Other shapes and configurations for the supports 5 are also contemplated and may be employed.

Figure 1:
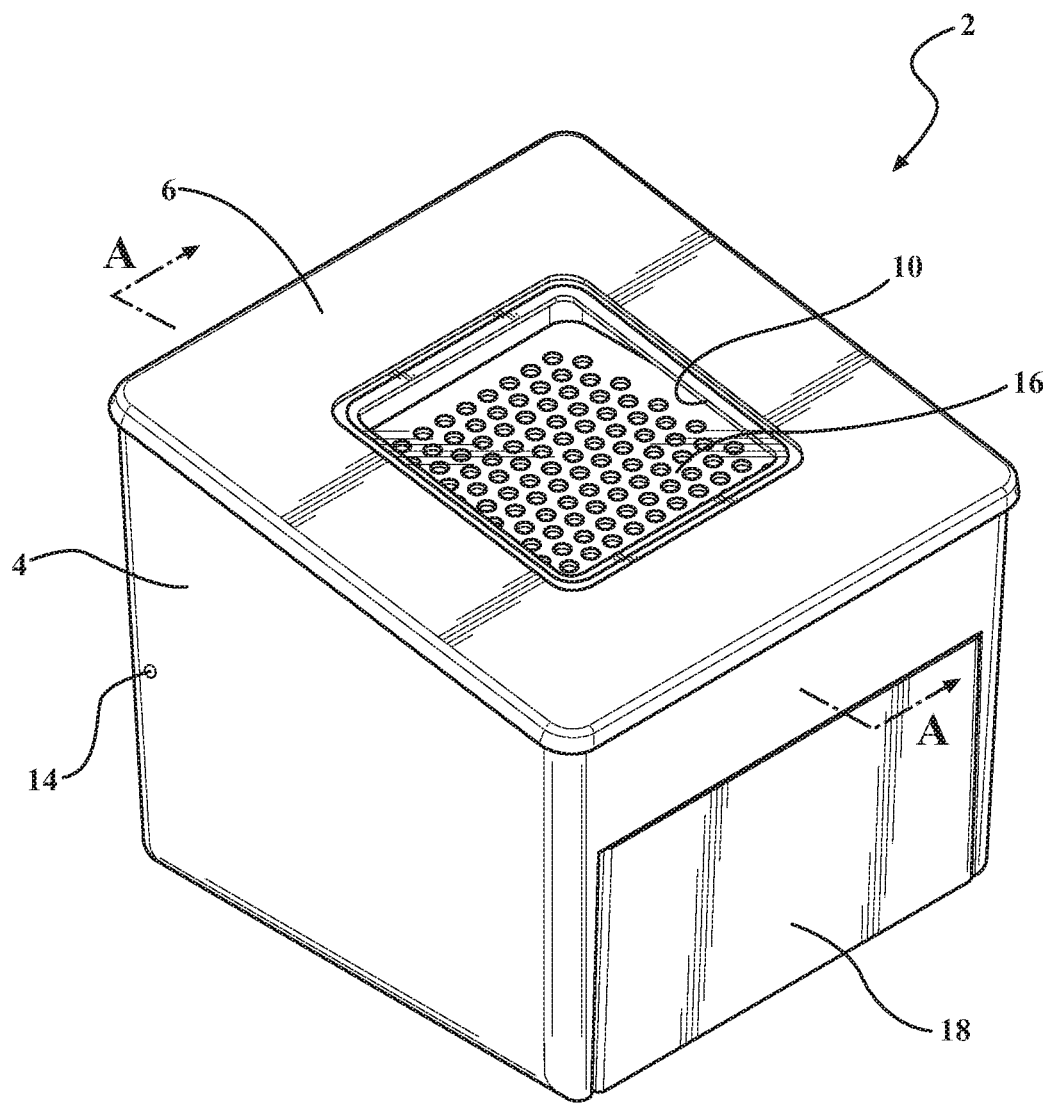
FIG. 1 is a top perspective view of a compost bin according to one embodiment of the disclosure.
Figure 2:
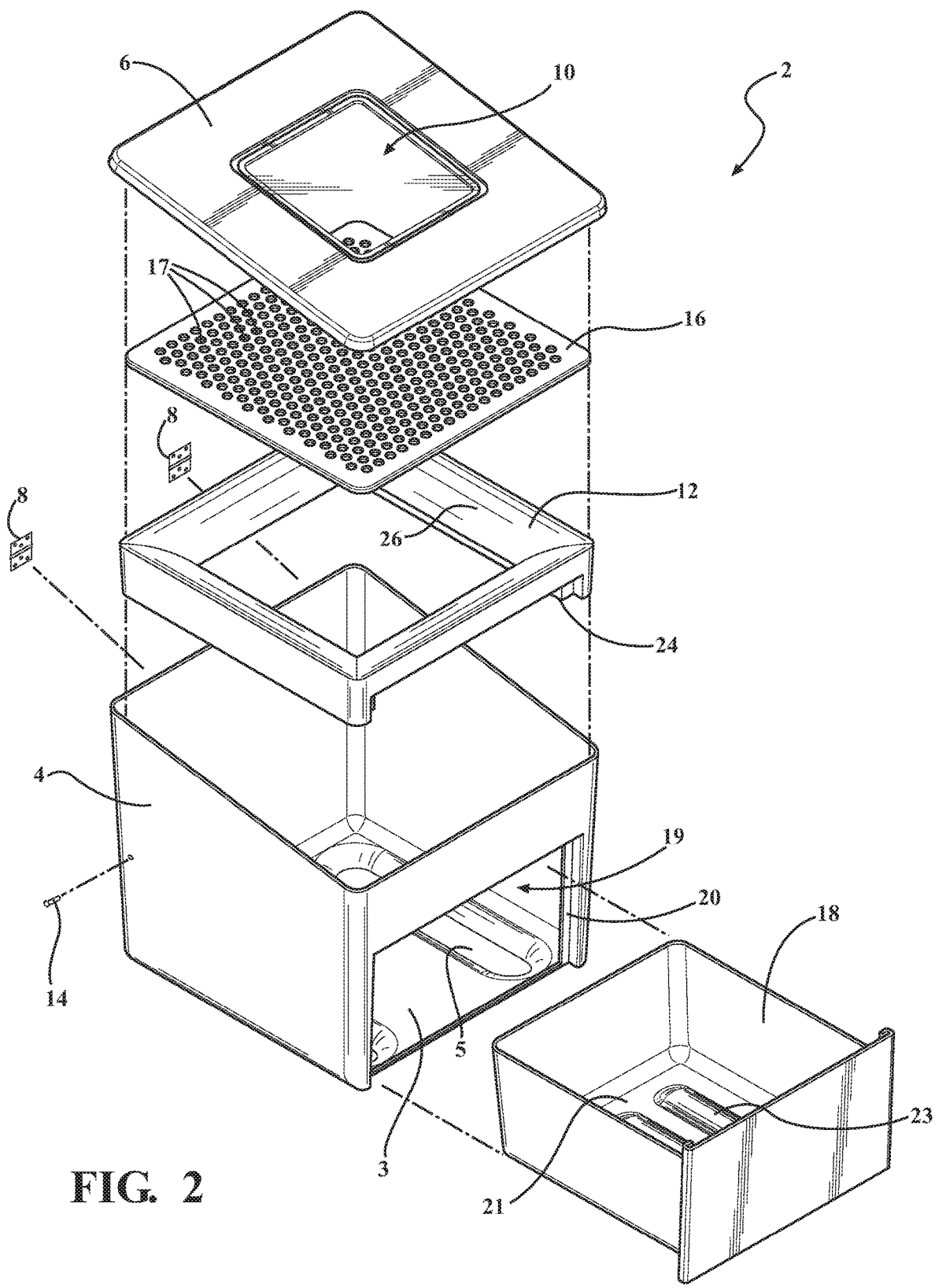
FIG. 2 is an exploded top perspective view of the compost bin shown in FIG. 1.

In certain embodiments, the lid 6 may be hingedly attached to the main body 4 with at least one hinge 8 (shown in FIG. 2). The hinge 8 may be any suitable type, such as a bi-fold, butt or living hinge, as desired. In other embodiments, the lid 6 may rest upon the main body 4 and may be entirely removed from the main body 4 where access to the main body is required.

The lid 6 also has a window 10 that covers a hole formed in the lid 6. The window 10 allows sunlight to naturally heat the interior of the main body 4 when the compost bin 2 is disposed outside and in operation. The window 10 is made of a suitable material that allows sunlight into the main body 4, but otherwise withstands or is resistant to the elements, such as glass or plastic. In a particular embodiment, the window 10 may be formed from a sheet of Lexan® polycarbonate, commercially available from the SABIC, headquartered in Riyadh, Saudi Arabia. One of ordinary skill in the art may also select other suitable transparent and weather-resistant materials for the window 10 within the scope of the disclosure.

It has been surprisingly found that the surface area of the window 10 is critical to maintaining the rigidity of the main body 4 when formed from plastic, during an operation of the compost bin 2 where temperatures may become greater than a softening point of the plastic. As nonlimiting examples, the surface area of the window 10 may be between 20% and 60% of the total surface area of the lid 6, in particular between 30% and 50% of the total surface area of the lid 6, and in a most particular embodiment about 40% of the total surface area of the lid 6. One of ordinary skill in the art may select other suitable window 10 sizes, for example, depending on the expected climate within which the compost bin 2 is intended to be used, as desired.

Figure 3:
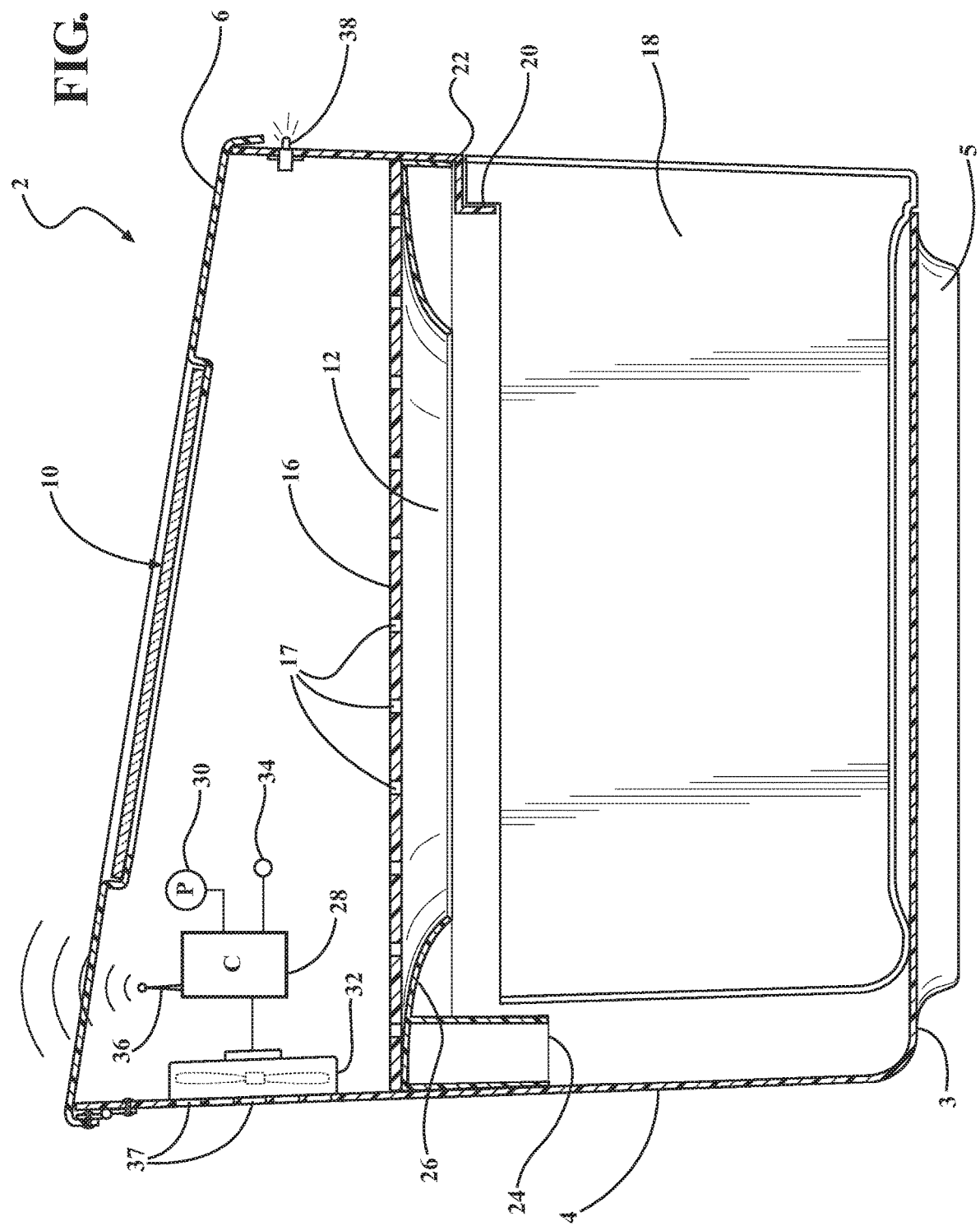
FIG. 3 is a cross-sectional side elevational view of the composter taken at section line A-A in FIG. 1, and illustrating an interior and electrical components of the compost bin.
Figure 9:
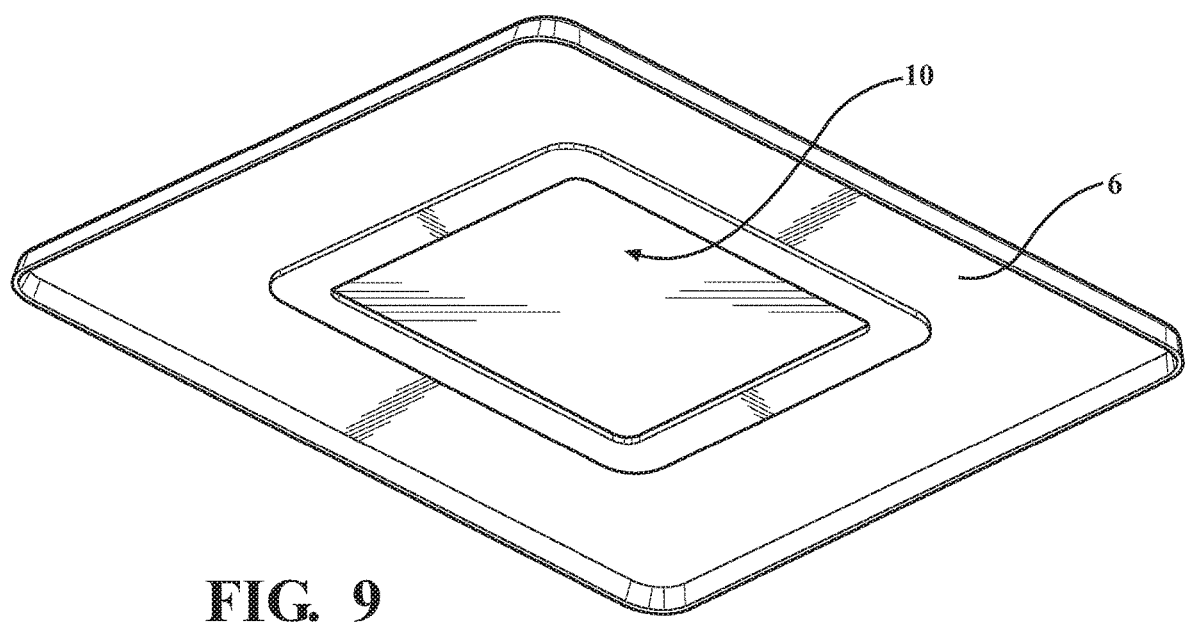
FIG. 9 is a bottom perspective view of an insert for the compost bin shown in FIG. 1.

Additionally, as shown in FIGS. 2-3 and 9, the main body 4 contains an internal frame 12. The internal frame 12 may be removably disposed within the main body 4, and can be secured to the main body 4 using fasteners 14, such as screws, bolts, or rivets, as non-limiting examples, or any other suitable fastener that may be selected by a skilled artisan. The frame 12 can also be irremovably secured by an adhesive or by welding. In certain embodiments, the frame 12 can be hollow, which decreases the weight of the compost bin 2 and conserves resources. The frame 12 may also be held in place by a rib or other structure disposed on the inner walls of the main body 4, as desired.

Figure 6:
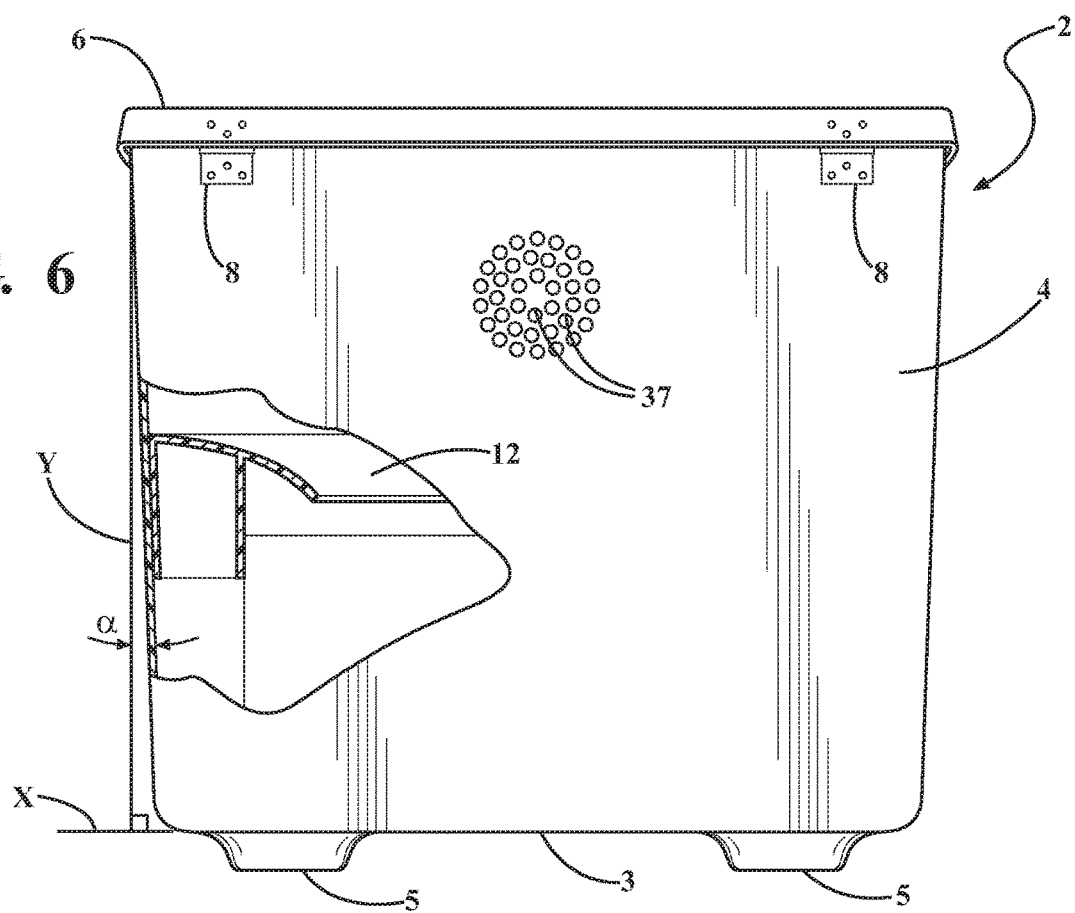
FIG. 6 is a rear elevational view of the compost bin shown in FIG. 1, with a portion of a rear wall removed to illustrate that the walls of the compost bin are tapered at an angle relative to a vertical axis.

In a most particular embodiment, as shown in FIG. 6, an inner wall or surface of the main body 4 can be tapered at a predetermined angle α relative to a vertical axis Y. The vertical axis Y may be orthogonal with a horizontal plane X on which the bottom of the main body 4 rests, for example. Due to this tapering, a periphery of the frame 12 abuts the interior main body 4 to suspend the frame 12 at a location above the base 3 of the main body 4. Advantageously, the abutting of the main body 4 by the frame 12 creates a friction fit between the main body 4 and the frame 12 and thereby militates against the frame 12 descending entirely to the bottom of the main body 4 when inserted within the main body 4. The abutting of the main body 4 by the frame 12 may also support a rigidity of the main body 4, particularly when the main body 4 is formed from plastic and in operation where temperatures within the main body 4 may otherwise approaching the softening point of the plastic.

A grate 16 is disposed atop the frame 12, and is configured to support the compost placed within the main body 4 in operation, as the compost decomposes. The grate 16 has a plurality of openings 17 to facilitate airflow to the compost resting atop the grate 16. In certain embodiments, the openings 17 may be have a plurality of circular holes arranged in a grid pattern across the grate 16. Although the grate may preferably be formed from plastic, it should be understood that the grate may be formed from other materials such as a metal. One of ordinary skill in the art may also select other suitable shapes and distributions for the openings 17 of the grate 16, and other suitable materials, as desired.

With reference to FIG. 2, the main body 4 has a side opening 19 formed in a wall of the main body 4. Upon assembly of the compost bin 2, the side opening 19 is arranged beneath the frame 12. that the side opening 19 is configured to receive a drawer 18 as shown in FIGS. 1-3 and 10. The drawer 18 collects the compost as it decomposes on the grate 16. The drawer 18 provides a convenient receptacle for the compost, and allows a user to retrieve the compost from the main body 4.

Figure 10:
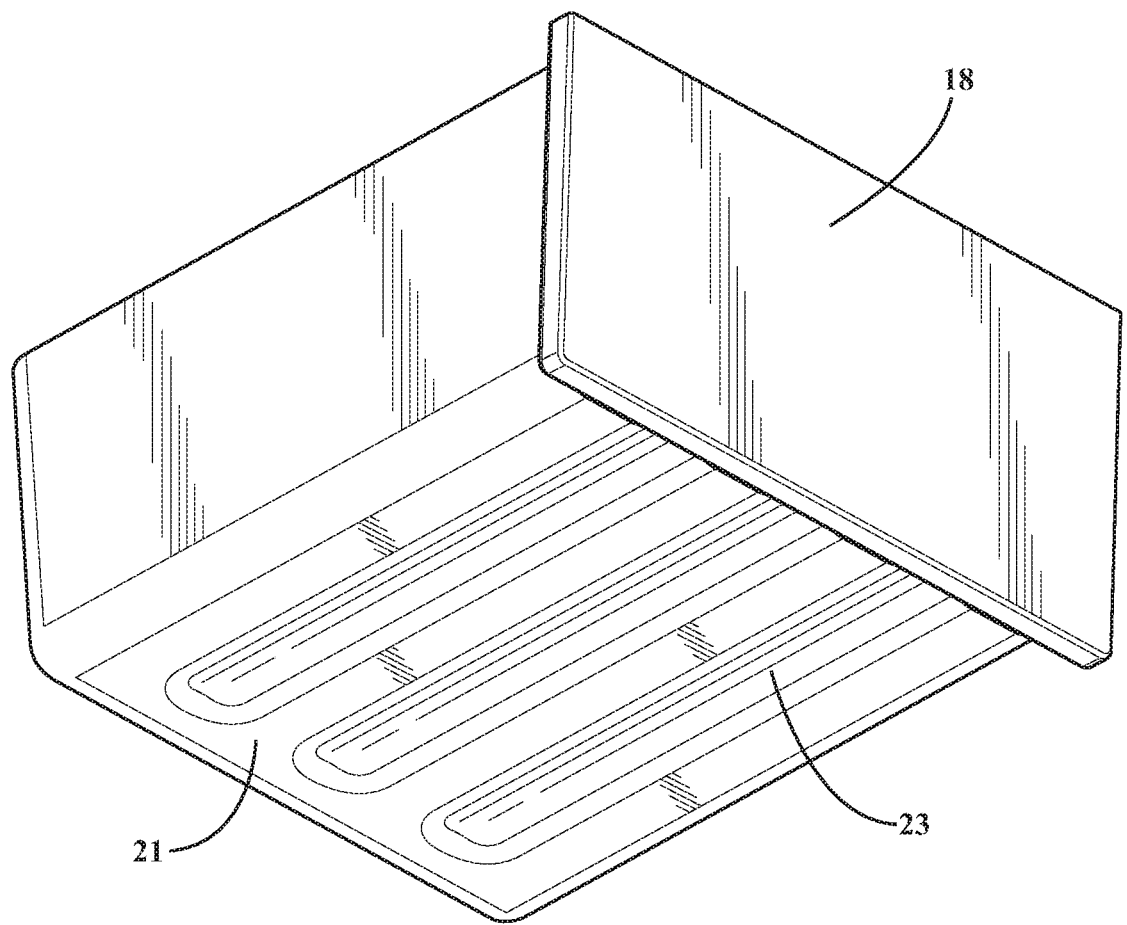
FIG. 10 is a bottom perspective view of a drawer for the compost bin shown in FIG. 1.

As shown in FIG. 10, the drawer 18 may also have a base 21 with at least one upwardly oriented recess 23. The recess 23 minimizes surface area contact with the base 3 of the main body 4, and thereby facilitates a sliding of the drawer 18 within the main body 4 for removal of the compost when completed. The upwardly oriented recess 23 may also contribute to a structural rigidity of the drawer 18, and facilitate the removal of the compost when the drawer 18 is removed from the main body 4.

Referring now to FIG. 3, the main body 4 may have an internal lip 20 formed on an inner surface of the main body 4. The internal lip 20 is configured to support a ridge 22 of the frame 12. The ridge 22 and the internal lip 20 of the main body 4 may also be configured to receive an upper edge of the drawer 18 when fully inserted into the side opening 19, and function as a hard stop for the drawer 18.

In certain examples, the frame 12 also has a lower edge 24. Upon assembly of the compost bin 2, the lower edge may surround the drawer 18 when inserted fully through the side opening 19. The lower edge 24 thereby ensures the drawer 18 is in a position to collect the compost falling from the grate 16 during the composting process in operation of the compost bin 2. To further facilitate the compost falling into the drawer 18 through the grate 16, the frame 12 may have a sloped rim 26, as shown in FIG. 3. The lower edge 24 of the frame 12 may also be configured to constrain a periphery of the drawer 18 so that there is a space formed between the periphery of the drawer 18 and an inner surface of the hollow main body 4 when the drawer 18 is inserted into the hollow man body 4.

As earlier disclosed, the main body 4, frame 12, grate 16, drawer 18, and lid 6 may be formed from a temperature-resistant plastic that remains rigid at the temperatures associated with the composting process. A skilled artisan may also select other suitable material such as wood, metal, and composite materials, as desired.

With continued reference to FIG. 3, the compost bin 2 may also have a controller 28 configured for monitoring the interior conditions and state of the compost within the main body 4. The controller 28 may be formed on a circuit board having a process, resistors, wire leads, and other electrical components, or on a computer having a processor and a memory on which processor-executable instructions are tangibly embodied. When provided in the form of a circuit board, the processor may be a U-blox® module manufactured by U-blox Holding AG in Thalwil, Switzerland, as a non-limiting example. In particular, the controller 28 may be configured to withstand the temperatures associated with the interior of the compost bin 2 in operation, where disposed within the compost bin 2, or may be configured to withstand the elements, where disposed outside of the compost bin 2. It should be appreciated that the architecture of the controller 28 may be selected by one of ordinary skill in the art as desired.

The controller 28 may be in electrical communication with a power source 30, such as a battery, electrical outlet, or solar panel, as non-limiting examples. The controller 28 is also in electrical communication with a fan 32. The fan 32 is configured to regulate the internal temperature of the main body 4. The controller 28 may further be in electrical communication with a temperature sensor 34. The controller 28 may collect the internal temperature of the compost bin 2 using the temperature sensor 34 at regular or predetermined intervals.

In an exemplary embodiment, a wireless transceiver 36 may also be in electrical communication with the controller 28. The wireless transceiver 36 may function as both a receiver and a transmitter, and enables the controller 28 to receive and transmit data wirelessly. In another example, the compost bin 2 may be provided with a separate receiver and a separate transmitter, both in communication with the controller 28, in lieu of the singular wireless transceiver 36.

The controller 28, using data from the temperature sensor 34, is configured to monitor the temperature inside the main body 4 during operation of the compost bin 2. When the temperature inside the main body 4 rises above a predetermined temperature, the controller 28 is configured to engage the fan 32 to stimulate airflow out of the main body 4, thereby lowering the internal temperature. The fan 32 may be mounted inside the main body 4, as shown in FIGS. 1-6, or it may be mounted outside the main body 4, as desired. In certain embodiments, the main body 4 also has a plurality of vent holes 37, allowing the fan 32 mounted inside the main body 4 to dispel air outside the compost bin 2, as illustrated in FIGS. 3-4 and 6.

The various electrical components described hereinabove may be affixed to the main body 4 using any suitable means, including mechanical fasteners such as screws, bolts, rivets, and welds, or by chemical adhesives.

In operation, as the compost decomposes, beneficial bacteria and other microorganisms consuming organic waste produce heat. After a period of time, the heat produced from decomposition kills pathogens in the compost pile, providing a finished product that is safe to handle and prevents the spread of disease. However, if the temperature inside the main body 4 exceeds 160° F., the bacteria responsible for composting the material will die, halting the decomposition process. Accordingly, in certain embodiments, the controller 28 is programmed to activate the fan 32 once the temperature inside the main body 4 is about 160° F., for example, between 158° F. and 162° F.

Once activated, the fan 32 will expel the warm air out of the main body 4, lowering the temperature below 160° F. It should be appreciated that the compost bin 2 is not completely sealed or air tight in this case, and that cooler ambient air may be drawn into the main body 4 through gaps adjacent to either the lid 6 or the drawer 18, for example. Alternatively, further vent holes 37 may be provided either outside of the outer perimeter of the fan 32, or elsewhere in the main body 4, lid 6, or drawer 18, to permit the drawing in of the cooler ambient air when the fan 32 is activated.

Furthermore, the controller 28, may be configured to calculate when the pathogens in the compost are eliminated by using the data from the temperature sensor 34. For example, after the compost has been above a predetermined temperature for a predetermined period of time, as determined by an internal clock of the controller 28, the controller 28 may alert the user that the compost is safe for removal and end use. The controller 28 may notify the user, using the transceiver 36 to send a Bluetooth® notification, text message, email, or any other electronic notification chosen by a skilled artisan. The controller 28 may notify a user using an indicator 38, which may be located on the main body 4 as shown in FIG. 3. The indicator 38 can be a light, meter, knob, or any other suitable means for alerting the user to the status of the compost, as desired.

Figure 7:
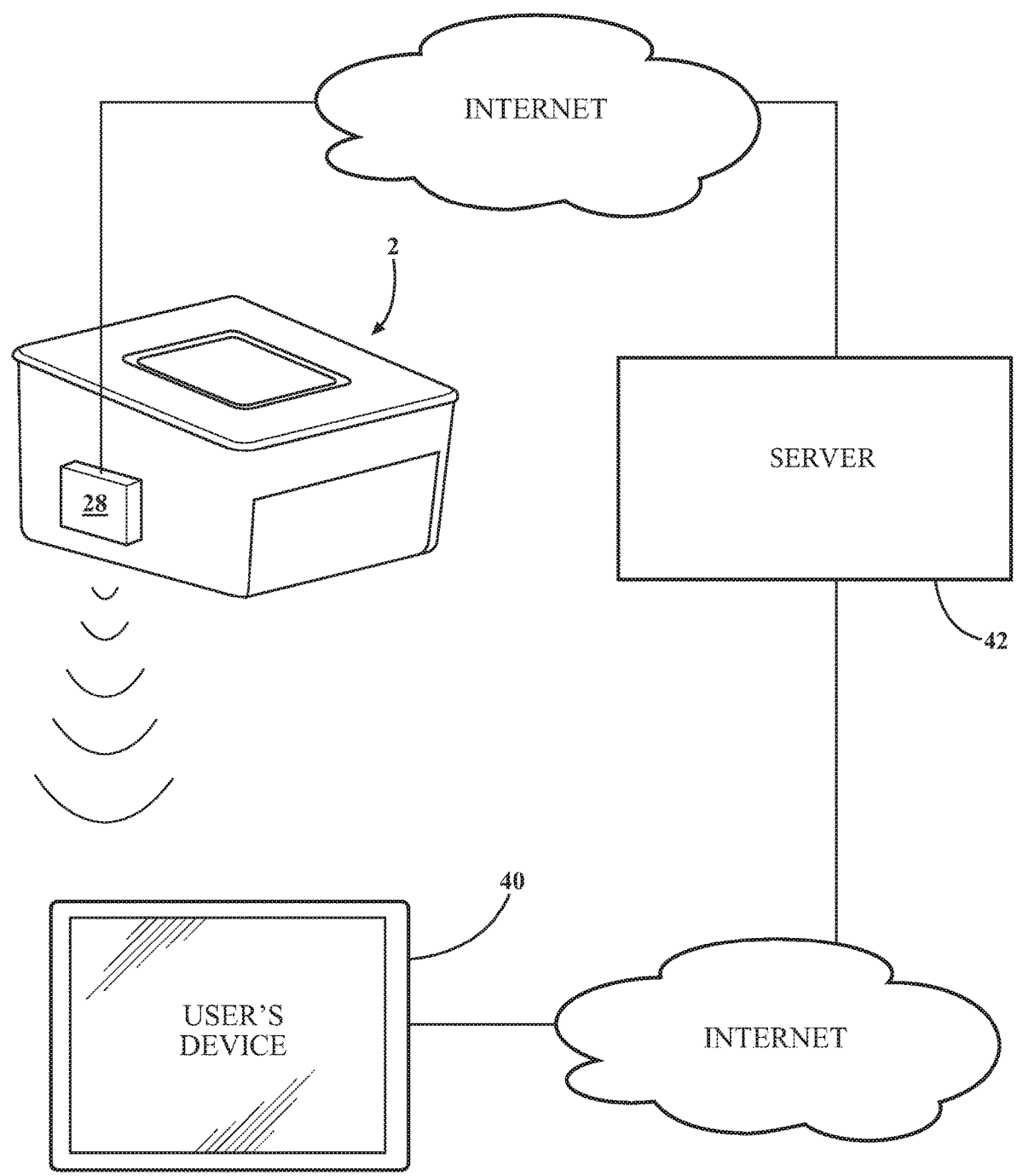
FIG. 7 is a schematic diagram of the compost bin in communication with a user device and a server having a memory with a database either directly or over a computer network such as the Internet.
Figure 8:
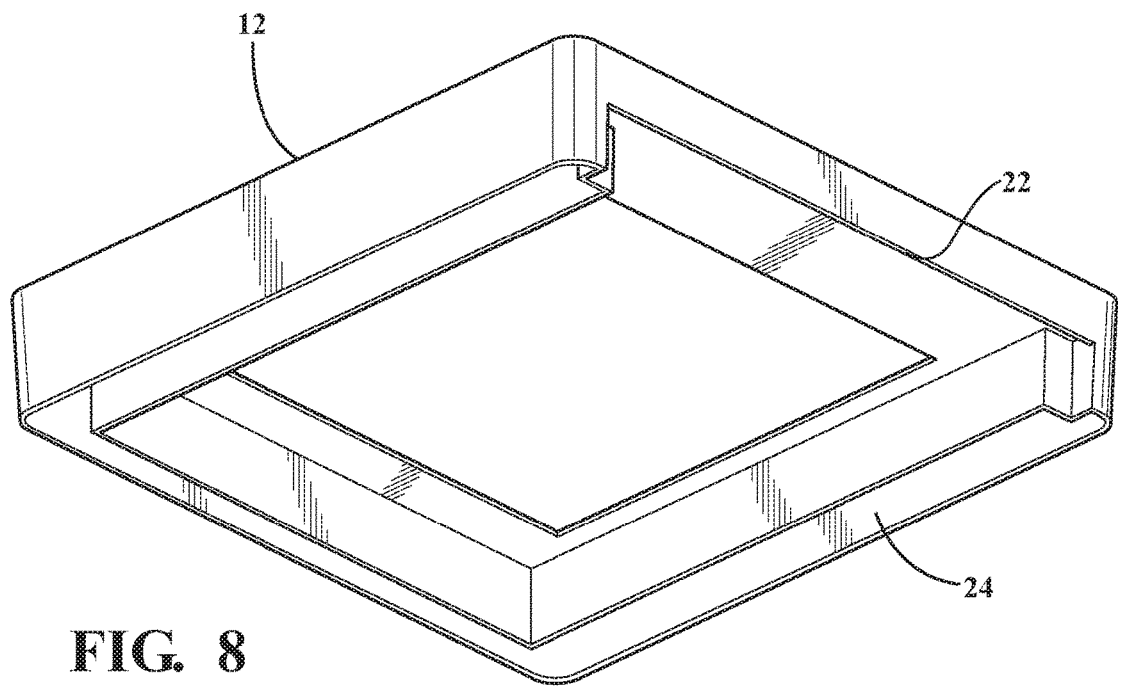
FIG. 8 is a bottom perspective view of a lid for the compost bin shown in FIG. 1.

FIG. 7 illustrates a system including the compost bin 2 in electronic communication with a user device 40. The controller 28 may be in constant or periodic communication with the temperature sensor 34, and store the information on a tangible, non-transient, computer-readable memory either on the controller 28 or offsite. As a non-limiting example, the controller 28 may collect the temperature every half (½) hour and relay the temperature data to a server 42 having a processor and the memory with a database every four (4) hours. The server 42 may be a computer server on the Internet, or may be a computer or mobile device connected directly (either wired or wirelessly) to the controller 28, for example. One of ordinary skill in the art may also select other suitable periods for collection and relaying of data to the server 42 within the scope of the present disclosure.

After a predetermined temperature is reached inside the main body 4 for a predetermined period of time, either the controller 28, or the server 42 will send a notification to the user device 40, informing the user that the compost is safe to use. In a specific example, once the temperature inside the main body 4 remains between 120° F. and 140° F., for a period of 1-2 days, the controller 28 may alert the user that the compost is safe for use. Other temperatures and predetermined periods of time may also be employed by the skilled artisan.

In certain embodiments, the user device 40 may have stored on a memory an application which communicates directly (wired or wirelessly) with the server 42 and/or the controller 28. The application can be compatible with the software program on the device 40 of the user's choosing. Software compatibility will include but is not limited to Android®: Java® and Android Studio®, Apple®: Swift® and Xcode®, and Web App: html/PHP/CSS. One of ordinary skill in the art may select other types of software and platforms for the application to be used with the compost bin 2, as desired.

For example, once the user installs the application on the user device, the user can then register their device 40 with the server 42, using an individual code given upon purchase of the compost bin 2 or the controller 28. After inputting the individual code, the user can then track their data by viewing the temperature history, which may be stored in the database on the memory of the server 42. These applications may constantly or periodically read the temperature history on the server 42 and notify the user through push notifications, email, etc. that the compost is safe for use.

Advantageously, the compost bin 2 of the present disclosure is self-regulating, and facilitates the composting of waste by a typical consumer. The compost bin 2 informs the user when the compost is ready for removal, allowing for efficient use of the compost. The compost bin 2 is also capable of controlling the temperature of the compost, ensuring the beneficial bacteria survive, while removing harmful pathogens.

Additionally, in various embodiments, the controller, transceiver, fan, and temperature sensor may be sold separately as a kit, able to be mounted on a variety of composting devices. The kit enables a user to monitor the internal temperature of any compost bin, and informs the user when the compost is safe for use. The controller is able to activate the fan when the internal temperature of the compost bin reaches a predetermined temperature, ensuring the survival of the beneficial bacteria. The controller is able to communicate with the user through electronic notifications, either directly or through the Internet.

Other variations and embodiments of the present compost bin 2 are contemplated. Those skilled in the art will readily appreciate such variations upon carefully reviewing the above disclosure. Therefore, the present compost bin 2 is not to be limited by the above description, but is to be determined in the scope of the claims which follow.

What is claimed is:

1. A compost bin, comprising:
a hollow main body having a base, a plurality of sidewalls, and a lid, the plurality of sidewalls disposed on the base, the hollow main body having an upper opening and a side opening, the upper opening defined by the plurality of sidewalls and the side opening formed through one of the plurality of sidewalls, and the lid configured to selectively cover the upper opening;
a frame removably disposed through the upper opening and abutting interior surfaces of the plurality of sidewalls of the hollow main body, the frame suspended above the base of the hollow main body;
a drawer removably disposed in the side opening adjacent to the base and beneath the frame; and
a grate removably disposed through the upper opening and disposed atop the frame inside of the hollow main body.

2. The compost bin of claim 1, wherein each of the hollow main body, the frame, the drawer, and the grate is plastic.

3. The compost bin of claim 1, wherein each of the interior surfaces of the plurality of sidewalls of the hollow main body is angled relative to the base and a periphery of the frame has a friction fit with the interior surfaces of the plurality of sidewalls.

4. The compost bin of claim 1, wherein the hollow main body has an internal lip that is configured to abut a ridge on the frame.

5. The compost bin of claim 4, wherein the internal lip of the hollow main body and the ridge of the frame are configured to receive the drawer.

6. The compost bin of claim 1, wherein the frame has a lower edge that is configured to surround the drawer disposed in the side opening, the lower edge constraining a periphery of the drawer so that there is a space formed between the periphery of the drawer and an inner surface of the hollow main body.

7. The compost bin of claim 1, wherein the frame has a sloped rim.

8. The compost bin of claim 1, wherein the base has a pair of elongate supports.

9. The compost bin of claim 1, further comprising:
a fan coupled to the hollow main body and configured to selectively create an air flow within the hollow main body;
a controller in communication with the fan and configured to regulate the temperature inside of the hollow main body, the controller further configured to monitor the temperature of an interior of the hollow main body; and a transceiver in communication with the controller, the controller further configured to alert a user when the interior of the hollow main body remains at a predetermined temperature for a predetermined length of time, wherein the controller is configured to activate the fan when the temperature inside the hollow main body is about 160° F.

10. The compost bin of claim 9, wherein the controller is configured to notify the user when the predetermined temperature is 120-140° F., and the predetermined time is 1-2 days.

11. The compost bin of claim 9, wherein the controller is configured to alert the user through an electronic wireless notification to a user's device.

12. The compost bin of claim 9, wherein the controller alerts the user through an indicator affixed to the main body.

13. The compost bin of claim 9, wherein the controller is in communication with a temperature sensor disposed inside of the hollow main body.

14. The compost bin of claim 9, wherein the controller is in communication with a server having a database for storage of temperature data via the Internet.

15. The compost bin of claim 14, wherein the controller collects the temperature from within the hollow main body every half (½) hour and transmits that information to the server every four (4) hours.

16. A method of alerting a user when compost is safe for use, comprising:

providing a compost bin having a hollow main body having a base, a plurality of sidewalls, and a lid, the plurality of sidewalls disposed on the base, the hollow main body having an upper opening and a side opening, the upper opening defined by the plurality of sidewalls and the side opening formed through one of the plurality of sidewalls, and the lid configured to selectively cover the upper opening, a frame removably disposed through the upper opening and abutting interior surfaces of the plurality of sidewalls of the hollow main body, the frame suspended above the base of the hollow main body, a drawer removably disposed in the side opening adjacent to the base and beneath the frame, and a grate removably disposed through the upper opening and disposed atop the frame inside of the hollow main body, a fan coupled to the hollow main body and configured to selectively create an air flow within the hollow main body, a controller in communication with the fan and a temperature sensor, the controller configured to regulate the temperature inside of the hollow main body, wherein the controller engages the fan once the internal temperature of the hollow main body is about 160° F., and a transceiver in communication with the controller; and notifying, by the controller, the user when the interior of the hollow main body remains at a predetermined temperature for a predetermined length of time.

17. The method of claim 16, wherein the controller alerts the user through a direct wireless electronic notification to a user's device.

18. The method of claim 16, wherein the user is notified on a user device in communication with the controller through a computer network, wherein the controller is configured to notify the user when the predetermined temperature is 120-140° F., and the predetermined time is 1-2 days.

19. The method of claim 16, wherein the controller alerts the user through an indicator affixed to the main body.

* * * * *